LOADING AND UNLOADING WINCH-SYSTEM FOR TRACTION VEHICLES

Original Filed Sept. 4, 1964

INVENTOR.
REED RASMUSSEN
BY M Ralph Shaffer
HIS ATTORNEY

LOADING AND UNLOADING WINCH-SYSTEM FOR TRACTION VEHICLES

Original Filed Sept. 4, 1964

INVENTOR.
REED RASMUSSEN
BY M. Ralph Shaffer
HIS ATTORNEY

LOADING AND UNLOADING WINCH-SYSTEM FOR TRACTION VEHICLES

Original Filed Sept. 4, 1964

INVENTOR.
REED RASMUSSEN
BY M. Ralph Shaffer
HIS ATTORNEY

United States Patent Office

Re. 26,546
Reissued Mar. 25, 1969

26,546

LOADING AND UNLOADING WINCH-SYSTEM FOR TRACTION VEHICLES

Reed Rasmussen, Layton, Utah, assignor to Quadramics, Inc., Clearfield, Utah, a corporation of Utah Original No. 3,229,839, dated Jan. 18, 1966, Ser. No. 394,447, Sept. 4, 1964. Application for reissue Dec. 29, 1967, Ser. No. 698,979
Int. Cl. B60p *1/64, 1/12, 1/14*
U.S. Cl. 214—517 10 Claims

Matter enclosed in heavy brackets [ ] appears in the original patent but forms no part of this reissue specification; matter printed in italics indicates the additions made by reissue.

*ABSTRACT OF THE DISCLOSURE*

*A device for loading and unloading transportable objects onto and off of the bed of a traction vehicle which includes a sprocket journaled to the bed of the vehicle, a rack secured to the bottom of the transportable object to engage the sprocket, and means for driving the sprocket. Cables can be attached to the transportable object and to winch means secured to the bed of the vehicle for drawing the transportable object onto the vehicle bed until the rack attached to the bottom of the object contacts the sprocket. The rack can be a regularly perforated strap with individual perforations which receive the teeth of the sprocket.*

The present invention relates to winch constructions and, more particularly, to a winch system employing cables, winch drums, sprockets, and rack means wherein a transportable object may be easily moved from ground level onto the bed of a traction vehicle such as a pick-up truck or, alternatively, from the truck to the ground or other fixed support.

Accordingly, a principal object of the present invention is to provide a new and improved winch system.

A further object is to provide improved means whereby objects such as coaches and campers may be easily deposited onto or removed from the bed of a traction vehicle such as a pick-up truck.

A further object is to provide a new and improved support structure for coaches and pick-up carriers.

A further object is to provide an improved winch structure wherein the winch cable to be associated therein is releasably attachable thereto.

A further object is to provide a readily attachable winch structure which is easily secured to the bed, bumper or other structure of a pick-up truck.

A further object is to provide a combined cable and rack-sprocket drive for translationally displacing transportable objects such as coaches and campers, thus such that translational displacements are achieved in a continuous manner by the use, firstly, of cables and, secondly, by sprockets and co-acting racks.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
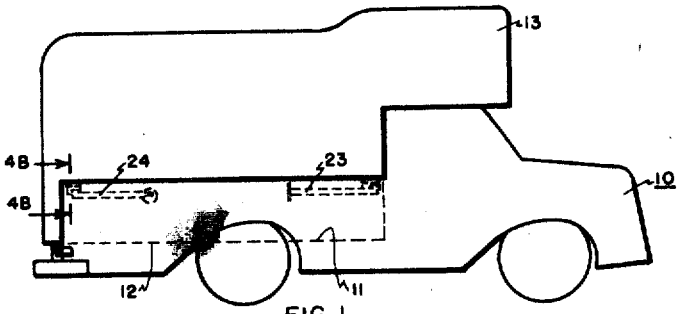
FIGURE 1 is a side elevation in line drawing of a traction vehicle having mounted or supported in the bed thereof an independent, transportable object such as a camper or coach.

In FIGURE 1 traction vehicle 10 is provided with a bed 11 supporting underside 12 of transportable object 13 such as a pick-up camper 13. In FIGURE 1 the camper is shown to be in transport position, being supported by the bed 11 of the vehicle 10 and ready for travel.

Figure 2:
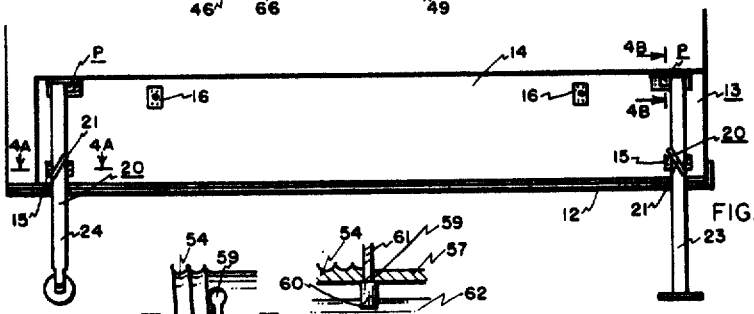
FIGURE 2 is an enlarged, fragmentary, side elevation of the lower portion of the camper or other transportable object of FIGURE 1 where the same is supported by novel leg means.
Figure 12:
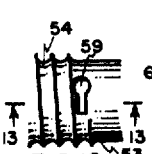
FIGURE 12 is a fragmentary detail in elevation of the keyhole slot provided in the wall of each of the respective winch drums.
Figure 13:
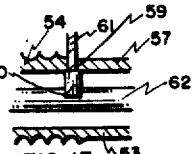
FIGURE 13 is a fragmentary sectional view taken along the line 13—13 in FIGURE 12, indicating the manner in which the keyhole slot retains the headed end of a respective winch cable.

Inner panel 14, see FIGURE 2, of camper 13 (one being included on each side of the camper) has attached thereto brackets 15 and 16 at both front and rear positions as shown. Both of these brackets at each position may be identical, with the same being secured in place by screws 17, see FIGURE 4A, and provided with a tapped aperture 18 for receiving the threaded shank 19 of securement means 20. The latter includes a T-bar handle 21, see FIGURE 4A, and the threaded shank is provided with a medial nut or other protrusion 22 for permitting the adjustment means to be threaded in and out of respective front and rear legs 23 and 24 without becoming detached therefrom. It will be understood that legs 23 and 24 are found on the opposite side of the camper as well. With reference to FIGURE 2 it is seen the legs are disposed vertically and are secured to lowermost brackets 15 in the manner shown in FIGURES 2 and 4A. Where the legs are to be retracted, then they are simply pivoted about pins P so that the attachment means 20 are this time threaded into the drilled and tapped apertures of brackets 16. Kindly note the dotted-line indications of the legs in FIGURE 1. As for the legs themselves, they each preferably include casters 28, see FIGURE 3, for the rear leg and extremity support plates 29 of the front legs. It will be understood that casters may also be journaled to the front legs 23. However, it may be desirable that the camper not move when set in upright position as shown in FIGURE 2; hence the provision of the friction producing, extremity support plates 29. Journaled axles 30 are supplied for the casters as needed.

Figure 4B:
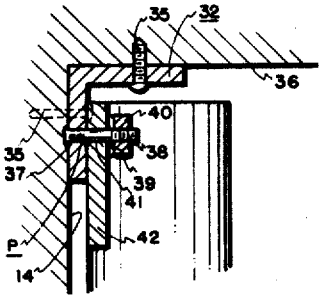
FIGURE 4B is an enlarged elevation taken along the line 4B—4B in FIGURE 2, and is shown in fragmentary view.

In order to accomplish the pivotal withdrawal or retrieval of the legs, brackets 32 and 33, see FIGURE 4B, are provided for each of the front and rear legs. FIGURE 4B best illustrates the configuration in cross-section of the representative bracket 32, with the same including screws 35 for securing these brackets in place between respective side panel 14, see FIGURE 4B, and upper bottom surface 36 of the camper or coach. The pivoting means includes a pin 37 which is threaded at 38 and includes washer 39 and stop nut 40. This pin serves as the pivot pin P for the respective legs, the same being disposed in aperture 41 of an ear 42 welded to a respective one of the legs 23 and 24.

Figure 8A:
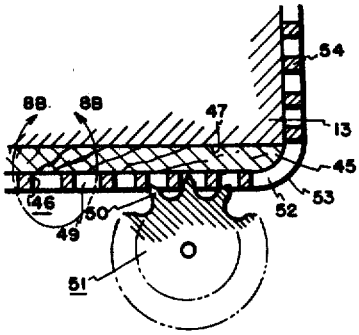
FIGURE 8A is an enlarged detail, shown principally in section and taken along the line 8A—8A in FIGURE 3, illustrating the co-action of guide and control sprockets with the racks secured to the underside of the camper.

The transportable object 13, such as the camper described, is shown in FIGURE 8A to include bottom spacer rail 45, which spaces rack means 46 from bottom surface 47 of the camper. These rack means 46 are longitudinally oriented along the lower edges of bottom surface 47, see FIGURE 10A, and the spacer rails 45 are preferably made of soft wood so that the sprockets hereinafter mentioned will simply feed into these rails as the racks are moved relative thereto. This will be explained later. Suffice it to say now that rack means 46 each comprise a preferably elongate strap which is regularly perforated by perforations 49 accommodating the teeth 50, see FIGURE 8A, of respective sprockets 51 hereinafter explained. There will be a relief aperture area 52 disposed proximate the lowermost region or junction 53 of front upstanding portion 54 of each of the racks with the remainder thereof, this for facilitating the commencement of engagement of respective sprockets 51 with the racks.

Figure 5A:
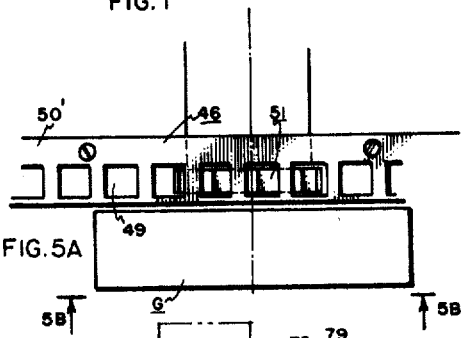
FIGURE 5A is an enlarged, fragmentary, partially schematic view taken along the line 5A—5A in FIGURE 3 and illustrates rack and sprocket engagement at each of two sides of the structure.

It will be noted with respect to FIGURE 5A that the two racks 46 have their perforations 49 disposed on the outer side of the strap material, with margin 50 being solid and constituting an elongate width serving as a bearing surface for support by cylindrical bearing portion 52 of each of the respective winch drums 53. Winch drums 53 also include helically grooved, cable receiving portions 54 accommodating the wound placement thereon of winch cables 55 and 56. The wall 57 of each of the winch cable drums 53 are preferably provided with keyhole slots 59 for receiving the enlarged or headed end 60 of each of the winch cables 61. Thus, this aperture means 59 accommodates easy attachment of the winch cables to their respective drums. Each of the cable drums 53 may be identically mounted to common shaft 62, the latter being journaled in gear reduction housing boss 63 of housing 64 by means of bushing 65. Each of the cable drums 53 are mounted upon opposite lengths of shaft 62 by means of a respective, welded (see welds W), washer-configured spacer 66 and the pinning by pin 67 of the respective drum to boss 68 of sprocket 51, see FIGURE 11. It will be noted that the sprockets 51 are disposed adjacent to the cylindrical bearing portion 52 of each of the respective drums 53, see FIGURE 10.

Figure 8B:
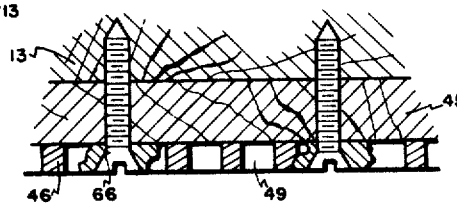
FIGURE 8B is an enlarged fragmentary detail, principally in section, of a representative portion of the rack and spacer rail construction, and is taken along the line 8B—8B in FIGURE 8A.

FIGURE 8B illustrates that countersunk screws 66 may be employed to secure the respective rack means 46 to each side edge of camper 13 through the respective spacer rail 45.

Support means 69 and G are simply support, journaling means for shaft 62, with the former constituting somewhat of an upstanding bearing and the latter a gear reduction box welded or otherwise secured to elongate winch mounting means or member 75. The latter preferably takes the form of an angle iron including depending pin means 76, see FIGURE 10B, and a pair of forwardly extending fork means 77, the former for depending insertion into respective apertures 78 provided vehicle bed and the latter for insertion underneath the bolt heads 79 of respective bolts 80 generally supplied the truck bed. Journal plates 81 and 82, which are integral with or affixed to the angle member 75, and include bushings 83 and 84 further serving to journal the shaft 62.

Gear box G includes the conventional housing 64 as before mentioned. The latter includes therewithin conventional gear reduction gearing, not shown; also included will be the conventional ratchet wheel 91, see FIGURE 5B, and spring loaded pawl 92, having spring 93, the former being pivoted to pivot shaft 93 and being adjustable by means of handle 94 for fixing the winch in any given disposition. This is all strictly conventional as regards gear reduction units having actuatable ratchet pawl stops.

Figure 6:
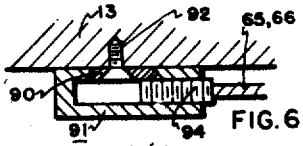
FIGURE 6 is an enlarged fragmentary, sectional detail taken along the arcuate line 6—6 in FIGURE 3, showing a representative attachment of a respective one of each of the two cables utilized in the winch system of the present invention.

Securement of cables 55 and 56 to the camper object is shown in representative form in FIGURE 6. Here the opposite ears 90 of internally threaded housing 91 are secured by countersunk screws 92 to the underside of camper 13, and a threaded extremity 94 is welded or otherwise secured to the respective cable and threadedly inserted therein. The headed end 60 at the opposite extremities of the respective cables may be conveniently releasably inserted into eye-bolt or hook retainers 95 threaded into the underside or, perhaps preferably, the forward section of the camper bed.

Figure 9:
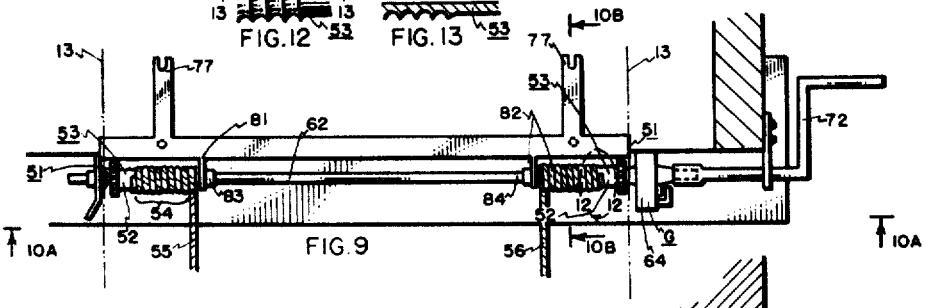
FIGURE 9 is a top plan of the winch system of the present invention wherein the same is releasably secured into place and ready for operation.

The structure above described operates as follows:

Let it first be assumed that the camper structure is supported on its legs in a manner as shown in FIGURE 2, and that it is now desired to load same into traction vehicle 10 which may take the form of a pick-up truck. The headed end 60, see FIGURE 7, of each of the cables will be released from their eye bolt or hook retainers 95 at the forward end of the camper and be attached to each of the respective, oppositely winding winch drums 53 at opposite ends of wind shaft 62. Subsequently, the winch crank or handle 72 in FIGURES 9 and 10A is turned so as to wind the cables upon their respective winch drums 53. This will be done in a manner such that the cables are directly beneath the camper and particularly the central portion C thereof, see FIGURE 10A, for supporting the weight of the camper when the front legs are lifted.

Figure 4A:
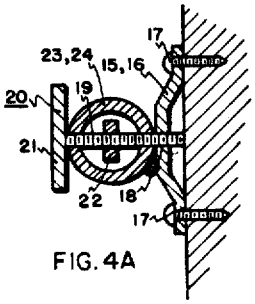
FIGURE 4A is a transverse horizontal section looking down, is taken along the line 4—4 in FIGURE 2, and is enlarged and rotated 90 degrees in a clockwise direction for convenience of illustration.
Figure 5B:
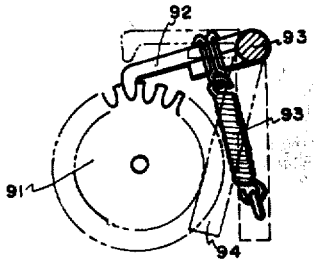
FIGURE 5B is a fragmentary view of a conventional pawl ratchet arrangement used in connection with the conventional gear reduction box utilized in the invention.
Figure 3:
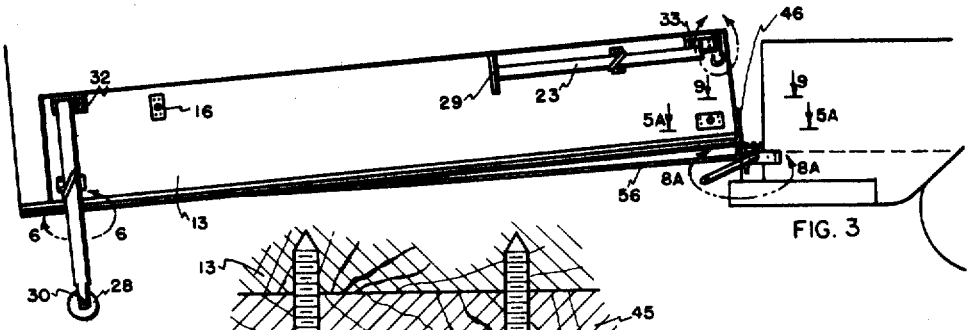
FIGURE 3 is a view of the structure of FIGURE 2 wherein the front legs of the structure have been re-oriented and entire camper is supported by winch cables and ready for loading into (or unloading from) the bed of a traction vehicle such as a pick-up truck.

Once the cables have been wound tight by the winch, then pawl 92 in FIGURE 5B retains these cables taut while the upper legs are in fact lifted and secured in position as illustrated in FIGURE 3, this by the securement means 20 shown in FIGURE 4A. The camper is further advanced forwardly by the turning in a clockwise direction of the winch through crank handle 72 so that sprockets 51 enter through opposite relief apertures 52 to engage the rack means 46 on both sides of the camper. These racks serve as guides, additionally, in addition to advancement and withdrawal means, so that the camper may be properly guided into and likewise suitably withdrawn from the vehicle bed.

It will be noted that the continued turning of crank 72 will cause an engagement, hence, of the racks 46 with their respective sprockets 51 and an urging of the former by the latter so that the camper is advanced into the bed of the truck. It will be noted at this point that substantially all of he work is or may be done by the racks, howbeit cable tautness, if being preserved throughout, may be of assistance. However, where the cables in the winch structure are designed such as to be ineffective at the lattermost extremity of travel of the camper relative to the bed, still the sprockets will be effective to advance the racks forwardly and hence the camper further forwardly into the truck bed. Now the headed ends of the cables 55 and 56 may remain in keyhole slots 59 of the winch drums while the camper is being transported.

When the camper is to be withdrawn from the bed then a reverse procedure is followed wherein the winch is turned in the reverse direction so as to cause sprockets 51 to turn in a counter-clockwise direction in order to advance the racks rearwardly. In such event the cables are simply inactive and all they do is unwind from the respective drums to be drawn rearwardly in accordance with the rearward movement of the camper. The counter-clockwise rotation of the crank is continued until the sprockets enter into relief areas 52 of their respective racks 46 and pass therebeyond. It will be noted that at this point the camper may be further lowered by the continued counter-clockwise rotation of the winch system since the racks simply slide off the winch drums; yet the camper is retained in a controlled descent by the cables again, disposed underneath the camper.

Prior to such continued descent the operator locks the ratchet wheel 91 by pawl 94 and lowers the front legs 23 of the camper. (It may be observed that the rear legs are previously lowered to erect condition once they are released from interference with the vehicle structure. Further, it will be noted that the casters 28 effectively provide for a rearward rolling movement of the camper while the same is being urged out of the truck or vehicle 10.)

Figure 7:
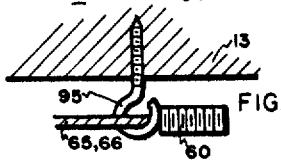
FIGURE 7 is an enlarged, fragmentary detail showing in section of a representative retaining means which may be used to retain in releasable manner the forward headed ends of the winch cables when the latter are not in use.

Once the legs 29 are secured in vertical positions as shown in FIGURE 2, then the winch can be further actuated until the legs come in further contact with the ground, at which point the headed ends of the cables 55 and 56 are released from keyhole slots 59 and redeposited onto eye-bolt mounts 95 in FIGURE 7.

What is obtained, therefore, is a unique structure, almost effortlessly actuated manually, wherein a camper may be conveniently withdrawn from a truck and mounted upon the ground and, correspondingly, conveniently lifted upwardly and deposited onto the bed of a truck or other traction vehicle.

In muddy or bumpy areas wooden planks or other means may be suitably deposited onto the ground in order to permit the casters 28 to roll freely along ground level while the camper is being urged toward or away from the traction vehicle.

Figure 10B:
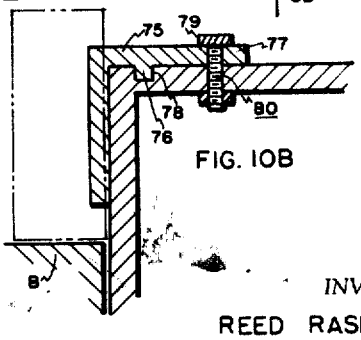
FIGURE 10B is an enlarged vertical section taken along the line 10B—10B in FIGURE 9, showing a representative construction of the elongate support member used in the winch system.
Figure 10A:
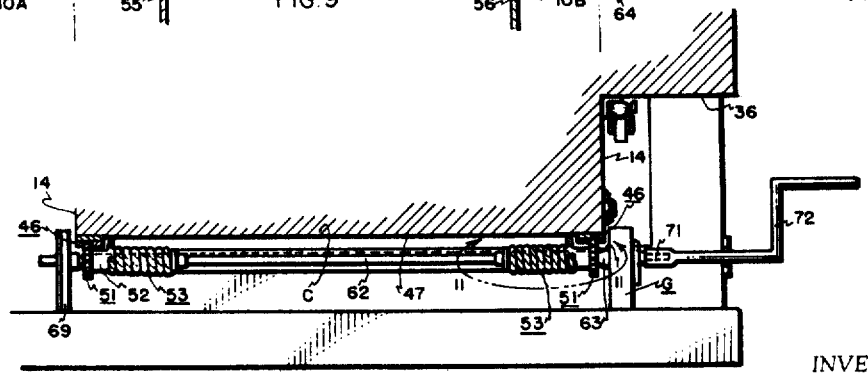
FIGURE 10A is a rear view of the structure in FIGURE 9 and is taken along the line 10A—10A in FIGURE 9.
Figure 11:
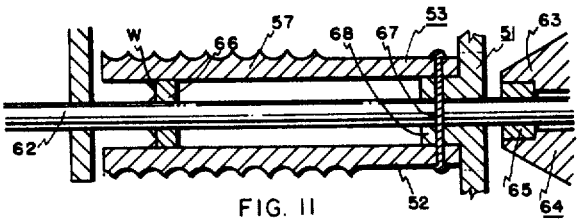
FIGURE 11 is an enlarged, fragmentary detail, principally in section of a fragmentary portion of the winch structure and is taken along the line 11—11 in FIGURE 10A.

The winch is very conveniently secured either to the bumper B of the vehicle, where the same is at an appropriate level or the support means suitably extended in a downward direction or, preferably, where the same is mounted as an elongated angle by means of pins and forks herefore explained and shown in FIGURE 10B.

It will be understood throughout that the term "sprocket" shall refer not only to conventional sprockets but also to other types of gearing such as spur gear, pinions, etc. The term rack shall include not only conventional, toothed rack gears but also perforated straps and equivalent elongate structures. The term "cable" shall include all type of elongate connectors including chains, ropes, wire cable, and so forth.

It will be understood that the cables may be releasably secured to the camper and permanently secured to the winch drums if so desired; however, the construction shown is deemed preferably for ease of operation.

It is preferable that the winch be constructed so that the winch drums in fact support the camper during its traverse thereover; however, this need not necessarily be the case so long as the margin and preferably the inner margin of the rack means in fact engage the cylindrical portions 51 of the respective winch drums 53.

The term "keyed" and similar terms used throughout shall be understood as referring to tying, fixing, gearing, or otherwise intercoupling respective parts together for mutual revolvement.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. In combination with a traction vehicle having a bed and a transportable object constructed for removable placement upon said bed: winch means supported by and mounted to said traction vehicle and disposed proximate the rearmost extremity of said bed; cable means secured to and between said transportable object and said winch means; means for revolving said winch means coupled thereto; sprocket means keyed to said winch means for revolvement therewith; and rack means fixedly secured to and longitudinally disposed with respect to said object and engageable with said sprocket means for enabling said object to be advanced upon and withdrawn from said bed, upon the operation of said winch, during engagement of said sprocket means with said rack means, said winch means and rack means being so constructed and arranged that the winding of said winch means automatically effects the sequence of drawing of said object toward said bed by said cable means, the engagement of said sprocket means with said rack means, and the advancing of said object along said bed through engagement of said sprocket means with said rack means.

2. Structure according to claim 1 wherein said sprocket means comprises a pair of keyed, coaxial, mutually spaced sprockets the axis of which is horizontal, normal to, and transverse with respect to said bed, said rack means comprising a pair of racks constructed for engagement with said sprockets, respectively, said racks being longitudinally disposed with respect to said object and mutually spaced on load-bearing under-surfaces thereof.

3. Structure according to claim 1 wherein said object is provided with retrievable leg means, selected ones of said leg means being provided with casters.

4. Structure according to claim 2 wherein said sprockets have individual sets of peripheral sprocket teeth, said racks individually comprising regularly perforated straps the individual perforations of which engagingly receive the teeth of said sprockets.

5. Structure according to claim 2 wherein said winch means include a pair of keyed winch drums having respective cable receiving portions and cylindrical bearing portions adjacent thereto for supporting said racks, said sprockets being respectively adjacent said bearing portions, and each of said racks including longitudinal bearing widths constructed for bearing engagement with and upon said bearing portions.

6. Structure according to claim 2 wherein said winch means includes a shaft, and pair of mutually spaced winch drums keyed to said shaft and having respective cable receiving portions and cylindrical bearing portions adjacent thereto for supporting said racks, said sprockets being respectively adjacent said bearing portions, and each of said racks including longitudinal bearing widths constructed for bearing engagement with and upon said bearing portions.

7. Structure according to claim 4 wherein perforated straps include upstanding, forward extremity portions secured to said object at a forward side thereof, said perforated straps including relief aperture means at the bases of each of said upstanding portions for admitting said sprockets.

8. Structure according to claim 5 wherein said sprockets have individual sets of peripheral sprocket teeth, said racks individually comprising regularly perforated straps the individual perforations of which engagingly receive the teeth of said sprockets, said bearing widths being adjacent said perforations and longitudinally disposed along said straps.

9. In combination with a traction vehicle having a bed and a transportable object constructed for removable placement upon said bed: a pair of mutually transversely spaced sprocket means; means for journaling said sprocket means [mounted] to said traction vehicle proximate said bed; rack means, *secured to the bottom of said transportable object for* [and] supporting said transportable object *on said vehicle bed, said rack means comprising,* [and] *regularly perforated straps the individual perforations of which are* selectively engageable with said sprocket means to be translated thereby; and means for driving said sprocket means coupled thereto.

*10. In combination with a traction vehicle having a bed and a transportable object constructed for removable placement upon said bed: sprocket means; means for journaling said sprocket means to said traction vehicle proximate said bed; rack means secured to the bottom of said transportable object for support said transportable object on said vehicle bed, said rack means comprising a regularly perforated strap the individual perforations of which engage said sprocket means to be translated thereby; and means for driving said sprocket means.*

References Cited

The following references, cited by the Examiner, are of record in the patented file of this patent or the original patent.

UNITED STATES PATENTS

| | | | |
|---|---|---|---|
| 2,423,906 | 7/1947 | Schultz | 254—150 |
| 2,534,156 | 12/1950 | Wyatt et al. | 214—517 |
| 2,742,261 | 4/1956 | Arnold | 254—150 |
| 2,789,715 | 4/1957 | Filipoff et al. | 214—517 |
| 3,162,477 | 12/1964 | Jackson | 296—23 |
| 3,170,724 | 2/1965 | Heil | 296—23 |
| 777,020 | 12/1904 | Hampton. | |
| 1,341,197 | 5/1920 | Reynolds. | |
| 2,352,129 | 6/1944 | Shonnard | 214—516 X |
| 3,221,913 | 12/1965 | Chamberlain | 214—517 |

ALBERT J. MAKAY, *Primary Examiner.*